United States Patent [19]

Greulich et al.

[11] Patent Number: 4,927,442
[45] Date of Patent: May 22, 1990

[54] METHOD OF PRODUCING OPEN-PORE SINTERED GLASS FILTERS AND PRODUCT

[75] Inventors: Norbert Greulich; Werner Kiefer; Veronika Rehm, all of Mainz, Fed. Rep. of Germany

[73] Assignee: Schott Glaswerke, Fed. Rep. of Germany

[21] Appl. No.: 323,088

[22] Filed: Mar. 14, 1989

Related U.S. Application Data

[63] Continuation of 07/116 024 Nov. 3, 1987 now abandoned.

[30] Foreign Application Priority Data

Nov. 5, 1986 [DE] Fed. Rep. of Germany ....... 3637690

[51] Int. Cl.$^5$ .......................... C03B 19/08; B32B 3/26
[52] U.S. Cl. .......................... 65/18.1; 65/18.3; 65/18.4; 65/22; 65/31; 210/510.1; 428/319.1
[58] Field of Search .................. 65/18.1, 18.3, 18.4, 65/22, 31; 264/42, 43, 49, 125; 210/510.1; 428/319.1

[56] References Cited

U.S. PATENT DOCUMENTS

| | | | |
|---|---|---|---|
| 1,081,573 | 12/1913 | Boeck | 210/510.1 |
| 1,515,653 | 11/1924 | Bertelson | 65/18.4 X |
| 1,863,070 | 6/1932 | Schönfeldt et al. | 210/510.1 |
| 3,414,394 | 12/1968 | Poad | 65/18.3 |
| 3,462,252 | 8/1969 | Veres | 65/18.4 |
| 3,486,872 | 12/1969 | Wojcik et al. | 65/18.4 X |
| 4,588,540 | 5/1986 | Kiefer et al. | 264/43 |

OTHER PUBLICATIONS

International Standard ISO 3585, First Edition–1976-0-4-01 Glass Plant, Pipeline and Fittings–Properties of Borosilicate Glass 3.3.
International Standard ISO 4793, First Edition–1970-1-0-01 Laboratory Sintered (Fritted) Filters–Porosity Grading, classification and designation.

*Primary Examiner*—Robert L. Lindsay
*Attorney, Agent, or Firm*—Fuller, Ryan & Hohenfeldt

[57] ABSTRACT

Filter bodies are made by mixing borosilicate glass powder, potassium sulphate and 30% aqueous polyethylene glycol solution per kilogram of mixture. The mixture is filtered and dried and glass particles of a different size are mixed into the dried granulate. The resulting mixture is compressed at a pressure of 1000 bar to form blanks and sintered at about 860° C. After cooling, the potassium sulphate is washed out of the blanks.

32 Claims, 2 Drawing Sheets

METHOD OF PRODUCING OPEN-PORE SINTERED GLASS FILTERS AND PRODUCT

This is a continuation of co-pending application Ser. No. 07/116,024 filed on Nov. 3, 1987 now abandoned.

BACKGROUND OF THE INVENTION

The invention relates to a method of producing open-pored sintered glass with special characteristics that allow its application as a filter for fluid or gaseous media.

Shaped parts composed of open-pored sintered glass with pore volumes of 50%–85% are produced according to conventional procedures. With pore volumes of more than 60%, however, flexural tensile strengths of only about 2 N/mm$^2$ result, which are too low for application as a filtering medium because the maximum applicable pressure differential would have to be considerably smaller than 1 bar. A possible solution to this problem might lie in making the filter thicker, which would, however, occur at the expense of the flow velocity.

The characteristics of the open-pored sintered glass with pore volumes over 60%, which are not advantageous for filtration, relate to two causes:

1. The distribution of pore sizes is relatively widely scattered around an average value. The flow velocity for a fluid or gaseous medium is mainly determined by the largest pore diameters, while the smaller pores contribute only a slight amount to this on the basis of the Hagen-Poiseuille Law. On the other hand, the pore volume formed by small pores diminishes the flexural tensile strength. FIG. 1 shows pore size distribution with a conventional sintered glass sample as measured by the mercurypenetration method. Other characteristics of this sintered glass body: Average pore diameter 27 $\mu$m, flexural tensile strength 1.8 N/mm$^2$, flow rate for water 16 ml/cm$^2$.s, pore volumes 74%.

2. Open-pore sintered glass produced according to the conventional manner has pores with highly structured inner surface areas, as the rastered electron-microscopic micrographs in FIG. 2 show. This high degree of structuring retards the free passage of flowing media. The retained filtration residues can be removed only with great difficulty. Furthermore, the illustrated structures can be the starting point for tears, which lower the flexural tensile strength.

The commercial laboratory filters which are composed of borosilicate glass 3.3 also have a highly structured inner surface, as the rastered electronmicroscopic micrograph in FIG. 3 shows, a broken-edge of a currently commercial laboratory filter composed of borosilicate glass 3.3 (DIN ISO 3585, 650 X magnification) is illustrated. Such filters are produced by means of sintering glass powder without the addition of a flux. The individual glass particles are still clearly recognizable as they existed prior to sintering. Such structures make the passage of flowing media and clean-up after use more difficult.

Additionally, such filters can only be produced with pore volumes of at most 50%; their pore radii have more widely scattered distributions than the sintered glass represented in FIG. 1.

A procedure for the production of porous sintered glass is known from U.S. Pat. No. 4,588,540, by which glass powder is mixed with a readily soluble substance and the mixture is heated to the sintering temperature of the glass and maintained there until the glass powder is sintered, after which the product is cooled and the readily soluble substance is dissolved from it. The pore size distribution resulting hereby is similar to the one represented in FIG. 1.

SUMMARY OF THE INVENTION

The objective of the following invention is to provide a method of producing open-pore sintered glass, having a large open-pore volume, high flexural tensile strength and good flow velocities, which is exceptionally well suited as a filter material.

By utilizing the method according to the invention the described disadvantages of the conventional open-pore sintered glass are eliminated. Particularly, the new method includes the steps of producing a parent granulated material composed of a first fine grained glass powder, a coarse grained salt powder and a bonding material. A second fine grained glass powder in the amount of 5 to 20 weight percent with respect to the parent granulated material is added to the parent granulated material. The resulting mass is molded and sintered by heating to the sintering temperature of the glass. After cooling the salt is washed out of the sintered glass.

The second fine grained glass powder preferably has grain sizes <100 $\mu$m, preferably less than 40 $\mu$m.

Before mixing the second fine grained glass powder with the parent granulated material, the second glass powder can be mixed with a bonding agent to granulate the material. The second granulate material is preferably composed of glass powder having grain sizes between 63–400 $\mu$m.

According to this method, open-pored sintered bodies can be produced which have flexural tensile strengths of 7 to 12 N/mm$^2$, pore volumes of 60% to 75% and precisely adjustable pore diameters in the range of 10–15 $\mu$m, 30–40 $\mu$m, 80–100 $\mu$m or 110–150 $\mu$m. FIG. 4 shows, as an example of pore distribution in a sintered glass body. FIG. 5 shows a rastered electron microscopic micrograph of the same sintered glass body. Other characteristics of this sintered glass body are: average pore diameter 30 $\mu$m, flexural tensile strength 10 N/mm$^2$, flow rate for water 25 ml/cm$^2$.s, pore volume 67%. "N" stands for Newton, 1N=1 kg.m/sec$^2$.

It is well known that the distribution of pore radii represented by FIG. 4 is considerably closer to the desired average value (in this case, 15 $\mu$m) than that in FIG. 1. The material represented by FIG. 5 clearly features higher tensile strength values (10N/mm$^2$) than that represented by FIG. 2 (1.8 N/mm$^2$). When a comparison is made between FIG. 5 and FIG. 2, the considerably smoother structure of the pore walls in the sintered glass produced according to the invention becomes especially apparent.

An essential advantage of the procedure according to the invention is that now, laboratory filters which are composed of borosilicate glass according to DIN ISO 3585 can be produced according to the principle of open-pore sintered glass, featuring sufficient flexural tensile strength for filter application with a pore volume of more than 60% and therewith very high flow velocities with, for example, aqueous media.

As a result of pore walls which are smooth, rounded and not penetrated by 0.5 to 5 $\mu$m diameter micropores, as shown in FIG. 5, other, additional advantages result over various laboratory filter materials composed of ceramics or glass, and clean-up possibilities after use of the filter are considerably increased. Additionally, the wash procedure for removal of the salt used in the production of the filter is considerably accelerated.

DESCRIPTION OF A PREFERRED EMBODIMENT

Figure 1:
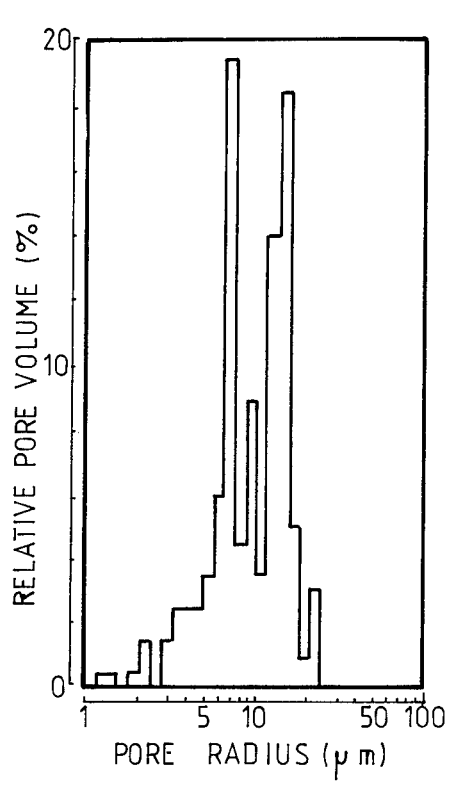
FIG. 1 shows the distribution of the pore radii in a body of open-pore sintered glass, produced according to the known procedure, the pore measuring method being mercury penetration.
Figure 4:
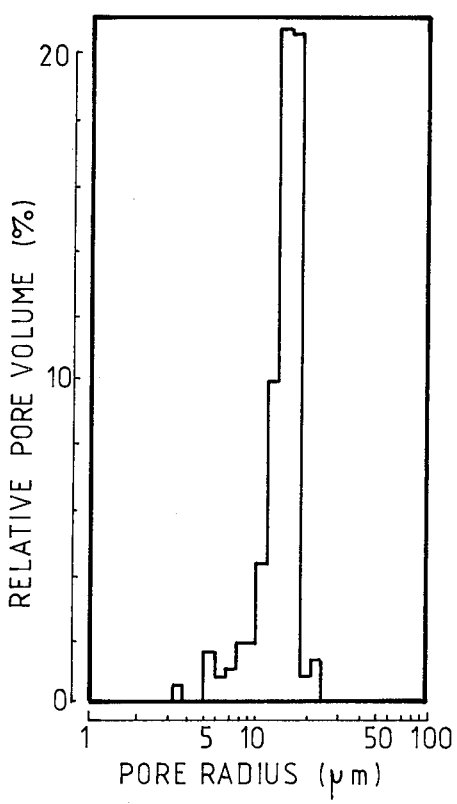
FIG. 4 shows the distribution of the pore radii in a sintered glass body produced according to the method disclosed herein, mercury penetration being the measuring method.
Figure 2:
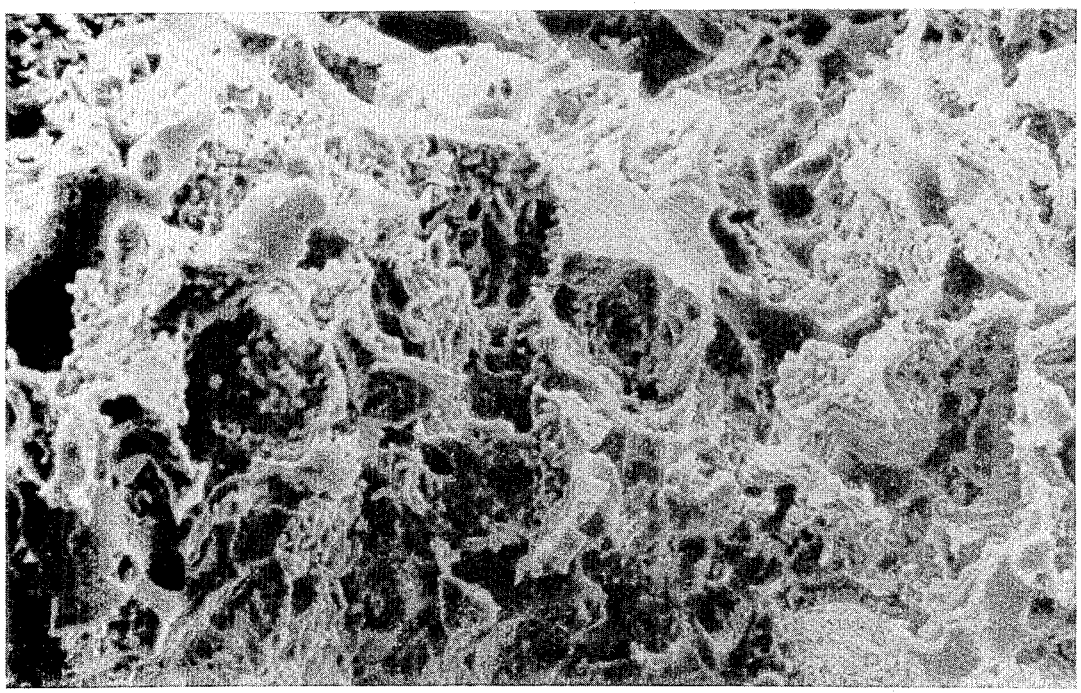
FIG. 2 is a rastered electron-microscopic micrograph, at 650 X magnification, of a broken edge of the sintered glass body described in FIG. 1.
Figure 3:
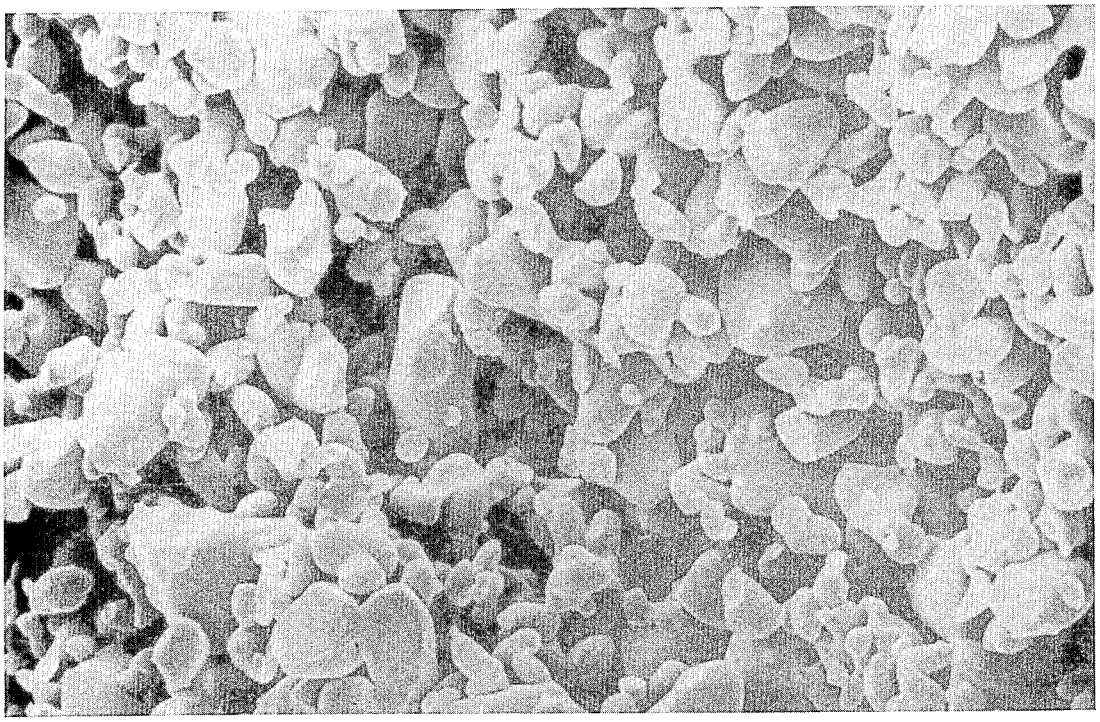
FIG. 3 is a rastered electron-microscopic micrograph, of a broken-edge of a currently commercial laboratory filter composed of borosilicate glass 3.3 per DIN ISO 3585 at 650 × magnification.
Figure 5:
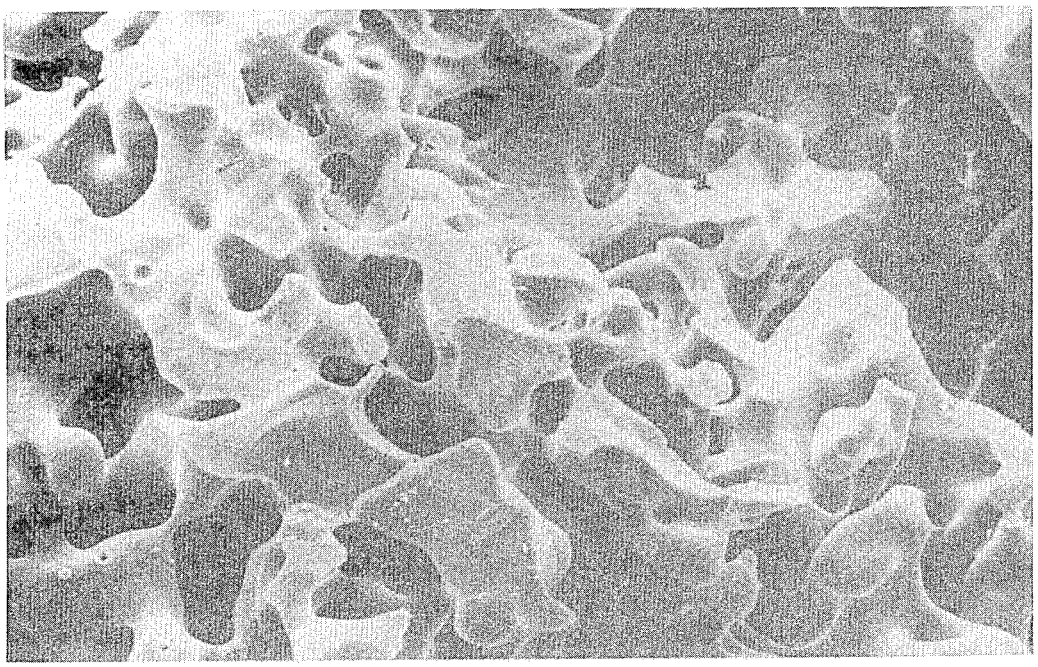
FIG. 5 is a rastered electron-microscopic micrograph at 650 × magnification of a broken-edge of the sintered glass body described in FIG. 4.

The invention is more thoroughly explained by the following examples. In these examples formulae are provided which can be used for laboratory filter pore-size categories according to ISO 4793. By selecting other salt grain sizes, the glass or the granulated material produced from it, according to the procedure as indicated by the invention, can also be used to produce filters having pore sizes other than those mentioned, with the same pore volume.

EXAMPLE 1

P 16—Filter.

75 weight % of $K_2SO_4$ (grain size <40 μm), 25 weight % of borosilicate Duran powder from the SCHOTT Glass-Works Company (Type Nr. 8330, grain size <20 μm), and 100 ml of a 30% aqueous polyethylene glycol solution per kg of mixture are vigorously mixed. The resulting mixture is dried and filtered to a 200–300 μm grain size. Into this parent granular material is mixed 10 weight %, with respect to the parent granular material, of pure glass powder of the above mentioned type with a grain size of <40 μm in the form of a granulate with the grain size of 200–300 μm. The resulting mixture is dry-compressed with a surface pressure of at least 1000 bar. The pressed blanks are sintered at 860° C., and following that the $K_2SO_4$ is completely washed out.

A filter is thus produced in the pore size class P 16, composed of borosilicate glass 3.3 according to DIN ISO 3585 and with the following characteristics:

| characteristics: | |
| --- | --- |
| Maximum pore diameter: | 15 μm |
| Flexural tensile strength: | 11 N/mm$^2$ |
| Pore volume: | 65% |
| Density: | 0.79 g/cm$^3$ |
| Flow rate for water | 6.5/ml/cm$^2$ · s |
| (1 bar pressure differential, 4 mm filter thickness) | |
| Flow rate for air | 28 m/NTP/cm$^2$ · s |
| (0.1 bar pressure differential and 4 mm filter thickness) | |

EXAMPLE 2

P 40—Filter.

75 weight % $K_2SO_4$ (grain size <40 μm), 25 weight % glass powder with a grain size of <20 μm, of the glass type indicated in example 1, and 100 ml of a 30% aqueous polyethylene glycol solution per kg of mixture are vigorously mixed. The resulting mixture is dried and filtered to a 200–300 μm grain size. 10 weight %, relative to the parent granulate material, of glass powder with a grain size of <100 μm but preferably <40 μm of the same glass type are added to the parent granulated material The resulting mixture is dry-compressed with a surface pressure of at least 1000 bar. The pressed blanks are sintered at 860° C. and next the $K_2SO_4$ is completely washed out A filter is thus produced in the pore-size class P 40, composed of borosilicate glass 3.3 according to DIN ISO 3585 with the following characteristics:

| | |
| --- | --- |
| Maximum pore diameter: | 31 μm |
| Flexural tensile strength | 7 N/mm$^2$ |
| Pore volume: | 67% |
| Density: | 0.75 g/cm$^3$ |
| Flow rate for water: | 29 ml/cm$^2$ · s |
| (1 bar pressure differential 4 mm filter thickness) | |
| Flow rate for air: | 183 ml/cm$^2$ · sec |
| (0.1 bar pressure differential, 4 mm filter thickness) | |

EXAMPLE 3

P 100—Filter.

55 weight % $K_2SO_4$ (grain size 100–200 μm), 45 percent by weight of glass powder with a grain size of 40–60 μm, of the glass type indicated in example 1, and 100 ml of an aqueous 30% polyethylene glycol solution per kg of the mixture are vigorously mixed. The resulting mixture is dried and filtered to a 200–300 μm grain size. 10 weight %, with respect to the parent granulate material, glass powder with grain size of <40 μm of the same glass type are added to the parent granulated material. The resulting mixture is dry compressed with a surface pressure of at least 1000 bar. The pressed blanks are sintered at 860° C. and next the $K_2SO_4$ is completely washed out.

A filter is thus produced in a pore-size class P 100, composed of borosilicate glass 3.3 according to DIN ISO 3585 with the following characteristics:

| | |
| --- | --- |
| Maximum pore diameter: | 97 μm |
| Flexural tensile strength: | 5 N/mm$^2$ |
| Pore volume: | 60% |
| Density: | 0.93 g/cm$^3$ |
| Flow rate for water: | 45 ml/cm$^2$ · s |
| (1 bar pressure differential, 4 mm filter thickness) | |
| Flow rate for air: | 260 ml/cm$^2$ · s |
| (0.1 bar pressure differential, 4 mm filter thickness) | |

EXAMPLE 4

P—160—Filter.

55 weight % K$_2$SO$_4$ powder with a grain size of 100–200 μm, 45 weight % glass powder of the type indicated in example 1 and 100 ml of a 30% aqueous polyethylene glycol solution per kg of mixture are vigorously mixed. The resulting mixture is dried and filtered to a 200–300 μm grain size. Ten (10) weight % glass powder with a grain size of <100 μm, of the same glass type are added. The resulting mixture is dry compressed with a surface pressure of at least 1000 bar. The pressed blanks are sintered at 860° C. and finally the K$_2$SO$_4$ is completely washed out.

A filter is thus produced in the pore-size class P 160, composed of borosilicate glass 3.3 according to DIN ISO 3585 with the following characteristics:

| | |
|---|---|
| Maximum pore diameter: | 120 μm |
| Flexural tensile strength: | 3.5 N/mm$^2$ |
| Pore volume: | 67% |
| Density: | 0.78 g/cm$^3$ |
| Flow rate for water: (1 bar pressure differential, 4 mm filter thickness) | 74 ml/cm$^2$ · s |
| Flow rate for air: (0.1 bar pressure differential, 4 mm filter thickness) | 400 ml/cm$^2$ · s |

EXAMPLE 5

An open-pored sintered body is produced by mixing vigorously 70 percent by weight of K$_2$SO$_4$ (grain size less than 40 μm) and 30 percent by weight of borosilicate glass powder (type No. 8330 DURAN and No. 8230 or another borosilicate glass with alkaline concentration less than 3 percent by weight; the portion of No. 8230 may range from 0 to 100 percent by weight) and 100 ml of an aqueous 30% polyethylene glycol solution per kilogram of the mixture, adding and mixing 10 weight percent, with respect to the parent granulate material, of borosilicate glass powder with the same characteristics mentioned above, filtering and drying the resulting mixture, compressing the mixture with a surface pressure of at least 1000 bar to form blanks, sintering the blanks at about 920° C., and washing out the K$_2$SO$_4$. It is understood by those skilled in the art of glass filter making that in Examples 2–5 that the glass powder added to the parent granular material is also a granular material as was only stated in so many words in Example 1.

We claim:

1. Method for the production of open-pored sintered bodies composed of glass, having a large open-pore volume, high flexural tensile strength, predetermined pore sizes and high flow velocities for fluids and gases, by means of sintering a glass-salt mixture followed by washing out the salt, including the steps of:
   producing a parent granular material composed of fine grained glass powder, coarse grained salt powder, the salt having a melting point higher than the glass sintering temperature to prevent the salt from combining with the glass material, said salt being soluble in liquids that do not dissolve the glass, and a bonding material, and to the resulting granulated material admixing 5 to 20 weight percent, with respect to said granulated material, of fine grained glass powder, subjecting the resulting mass to a molding procedure to produce a molded body and sintering the body by heating to the sintering temperature of the glass, and afterwards washing out the salt from the sintered glass.

2. The method according to claim 1 wherein said salt is K$_2$SO$_4$.

3. The method according to any one of claims 1 or 2 wherein the grain size of the fine-grained glass powder which is admixed to said granular material includes grains of any size up to 100 μm.

4. The method according to any of claims 1 or 2 wherein the grain size of the fine-grained glass powder which is admixed to said granular material includes grains of any size up to 40 μm.

5. Open-pored sintered bodies according to any one of claims 1 or 2 having flexural tensile strengths of 7 to 12 N/mm$^2$, pore volumes of 60% to 75% and pore diameters in the range of 30 to 40 μm.

6. Open-pored sintered bodies according to any one of claims 1 or 2 having flexural strengths of 7 to 12 N/mm$^2$, pore volumes of 60% to 75% and pore diameters in the range of 80 to 100 μm.

7. Open-pored sintered bodies according to any one of claims 1 or 2 having flexural tensile strengths of 7 to 12 N/mm$^2$, pore volumes of 60% to 75% and pore diameters in the range of 110 to 150 μm.

8. Open-pored sintered bodies according to any one of claims 1 or 2 having flexural tensile strengths of 7 to 12 N/mm$^2$, pore volumes of 60% to 75% and pore diameters in the range of 10 to 15 μm.

9. A method of producing open-pored sintered bodies comprising:
   mixing vigorously 75% by weight of K$_2$SO$_4$ having grains of any size up to and including 40 μm, 25% by weight of borosilicate Duran glass powder type No. 8330, grain size of any size up to and including 20 μm, and 100 ml of a 30% aqueous polyethylene glycol solution per kilogram of mixture,
   filtering and drying the mixture to a granulate of 200 to 300 μm grain size parent material,
   mixing into the granular material 10% by weight, with respect to the parent granular material, of pure glass powder of the above-mentioned type having grains of any size up to and including 40 μm in the form of a granulate having grains whose size is in the range of 200 to 300 μm,
   drying the mixture and compressing the mixture with a surface pressure of at least 1000 bar to form blanks, and
   sintering the compressed blanks at about 860° C. and then, washing out the K$_2$SO$_4$.

10. A method of producing open-pored sintered bodies, comprising:
   mixing vigorously 75% by weight of K$_2$SO$_4$ having grains of any size up to and including 40 μm, 25% by weight of borosilicate Duran glass powder type No. 8330 having grains of any size up to and including 20 μm and 100 ml of 30% aqueous polyethylene glycol solution per kilogram of mixture to yield a parent granulate material,
   adding and mixing 10% by weight, relative to the parent granulate material of glass powder of the above-mentioned type having grains of any size up to and including 40 μm,
   filtering and drying the resulting mixture,
   compressing the mixture with a surface pressure of at least 1000 bar to form blanks,
   sintering the blanks at about 860° C., and
   washing out the K$_2$SO$_4$.

11. A method of producing open-pored sintered bodies, comprising:

mixing vigorously 55% by weight of $K_2SO_4$ having grains whose size is in the range of 100 to 200 μm and 45% by weight of borosilicate Duran glass powder type No. 8330 having grain size in the range of 40 to 60 μm, and 100 ml of aqueous 30% polyethylene glycol solution per kilogram of the mixture to yield a parent granulate material, adding and mixing 10% by weight, with respect to the parent granulate material, of borosilicate Duran glass powder type No. 8330 having grain sizes of any size up to 40 μm, filtering and drying the resulting mixture, compressing the mixture with a surface pressure of at least 1000 bar to form blanks, sintering the blanks at about 860° C., and washing out the $K_2SO_4$.

12. A method of producing open-pored sintered bodies comprising:

mixing vigorously 55% by weight of $K_2SO_4$ powder having grain sizes in the range of 100 to 200 μm, 45% by weight of borosilicate Duran glass powder type No. 8330 having grain sizes up to and including 20 μm, and 100 ml of 30% aqueous polyethylene glycol solution per kilogram of the mixture to yield a parent granular material, adding and mixing 10% by weight, relative to the parent granular material, of borosilicate Duran glass powder type No. 8330, having grain sizes up to and including 100 μm, filtering and drying the resulting mixture, compressing the mixture with a surface pressure of at least 1000 bar to form blanks, sintering the blanks at about 860° C., and washing out the $K_2SO_4$.

13. Open-pored sintered filter bodies composed of:

borosilicate glass particles having grains of any size up to and including 20 μm and borosilicate glass particles having grains of any size up to and including 100 μm, said particles being joined by sintering to yield a mass having interstices approximating the size of salt grains which have been washed out of the interstices where said salt grains have a range of sizes of any size up to and including 40 μm.

14. Open-pored sintered filter bodies composed of:

borosilicate glass particles having grains of any size up to and including 20 μm and borosilicate glass particles having grains of any size up to and including 40 μm, said particles being joined by sintering to yield a mass having interstices approximating the size of salt grains which have been washed out of the interstices where said salt grains had a range of sizes of any size up to and including 40 μm.

15. Open-pored sintered filter bodies comprised of:

borosilicate glass particles having a grain size in the range of 40 to 60 μm and borosilicate glass particles of any grain size up to and including 40 μm, said particles being joined by sintering to yield a mass having interstices approximating the size of salt grains which have been washed out of the interstices where said salt grains have a range of sizes from 100 to 200 μm.

16. Open-pored sintered filter bodies composed of:

borosilicate glass particles having grains of any size up to and including 20 μm and borosilicate glass particles having grains of any size up to and including 100 μm, said particles being joined by sintering to form a mass, the interstices in the sintered mass having sizes approximating the size of salt grains which have been washed out of the interstices where said salt grains have a range of sizes from 100 to 200 μm.

17. A method of producing open-pored sintered bodies comprising:

mixing vigorously 70% by weight of $K_2SO_4$ having grains of any size up to and including 40 μm and 30% by weight of borosilicate glass powder selected from the group consisting of type No. 8330 Duran glass, No. 8230 borosilicate glass or another borosilicate glass having an alkaline concentration in the range of up to 3% by weight, mixing into the resulting mixture a bonding agent consisting of 100 ml of an aqueous 30% polyethylene glycol solution per kilogram of the mixture to form a parent granulate material, adding and mixing 10 weight percent, with respect of parent granulate material, of borosilicate glass powder with the same characteristics mentioned above, filtering and drying the resulting mixture, compressing the mixture with a surface pressure of at least 1000 bar to form blanks, sintering the blanks at about 920° C., and washing out the $K_2SO_4$.

18. Method for the production of open-pored sintered bodies composed of glass, having a large open-pore volume, high flexural tensile strength, predetermined pore sizes and high flow velocities for fluids and gases, by means of sintering a glass-salt mixture followed by washing out the salt, including the producing a first granulated material composed of a first fine grained glass powder, coarse grained salt powder, the salt having a melting point higher than the glass sintering temperature to prevent the salt from combining with the glass material, said salt being soluble in liquids that do not dissolve the glass, and a bonding material, and processing a second fine grained glass powder into a second granulated material with the aid of a bonding agent, and admixing the second granulated material with the first granulated material, subjecting the resulting mass to a molding procedure to produce a molded body and sintering the body by heating to the sintering temperature of the glass, and afterwards washing out the salt from the sintered glass.

19. The method according to claim 18 wherein said salt is $K_2SO_4$.

20. The method according to any one of claims 18 or 19 wherein the second granulated material has grain size in the range of 63 to 400 μm.

21. The method according to any one of claims 18 or 19 wherein the grain size of the second fine-grained glass powder includes grains of any size up to 100 μm.

22. The method according to any one of claims 18 or 19 wherein the grain sizes of the second fine-grained glass powder includes grains of any size up to 40 μm.

23. Open-pored sintered bodies according to any one of claims 18 or 19 having flexural tensile strengths of 7 to 12 $N/mm^2$, pore volumes of 60% to 75% and pore diameters in the range of 10 to 15 μm.

24. Open-pored sintered bodies according to any one of claims 18 or 19 having flexural tensile strengths of 7 to 12 $N/mm^2$, pore volumes of 60% to 75% and pore diameters in the range of 30 to 40 μm.

25. Open-pored sintered bodies according to any one of claims 18 or 19 having flexural tensile strengths of 7 to 12 N/mm$^2$, pore volumes of 60% to 75% and pore diameters in the range of 80 to 100 μm.

26. Open-pored sintered bodies according to any one of claims 18 or 19 having flexural tensile strengths of 7 to 12 N/mm$^2$, pore volumes of 60% to 75% and pore diameters in the range of 110 to 150 μm.

27. A method of producing an open-pored sintered body comprised of glass and being essentially free of micropores and having a pore volume of at least 60%, comprising the following steps:
producing a parent granulated material composed of a first fine grained glass powder, coarse grained salt powder having a melting point higher than the glass sintering temperature to prevent the salt from combining with the glass, said salt being soluble in liquids that do not dissolve the glass, and a bonding material,
adding to the parent granulated material 5 to 20 weight percent, with respect to said granulated material, of a second fine grained glass powder,
molding the resulting mass to produce a molded body and sintering the body by heating to the sintering temperature of the glass, and
washing out the salt from the sintered glass.

28. The method according to claim 27 resulting in a filter pore-size category within the range of P16 to P160 according to ISO 4793.

29. The body according to claim 27 wherein said first glass powder and second glass powder are the same composition.

30. A method of producing a sintered glass body which is essentially free of micropores and having a pore volume of at least 60%, comprising the following steps:
producing a parent granulated material composed of a fine grained glass powder, coarse grained salt powder, having a melting temperature higher than the glass sintering temperature to prevent the salt from combining with the glass, said salt being soluble in liquids that do not dissolve the glass and a first bonding material,
to the resulting parent granulated material admixing 5 to 20 weight percent, with respect to said parent granulated material of a second granulated material composed of a second fine grained glass powder and a bonding material,
molding the resulting mass into a body and sintering the body by heating it to the sintering temperature of the glass, and
washing out the salt from the sintered glass.

31. The method according to claim 30 wherein the sintered body has a filter pore-size category within the range of P16 to P160 according to ISO 4793.

32. The method according to claim 30 wherein said first glass powder and second glass powder are of the same composition.

* * * * *

UNITED STATES PATENT AND TRADEMARK OFFICE
CERTIFICATE OF CORRECTION

PATENT NO. : 4,927,442

DATED : May 22, 1990

INVENTOR(S) : Greulich et al.

It is certified that error appears in the above—identified patent and that said Letters Patent is hereby corrected as shown below:

Column 8, Line 34:

After "including the" insert ---steps of:---

Signed and Sealed this

Eleventh Day of June, 1991

Attest:

HARRY F. MANBECK, JR.

Attesting Officer

Commissioner of Patents and Trademarks